Patented May 30, 1933

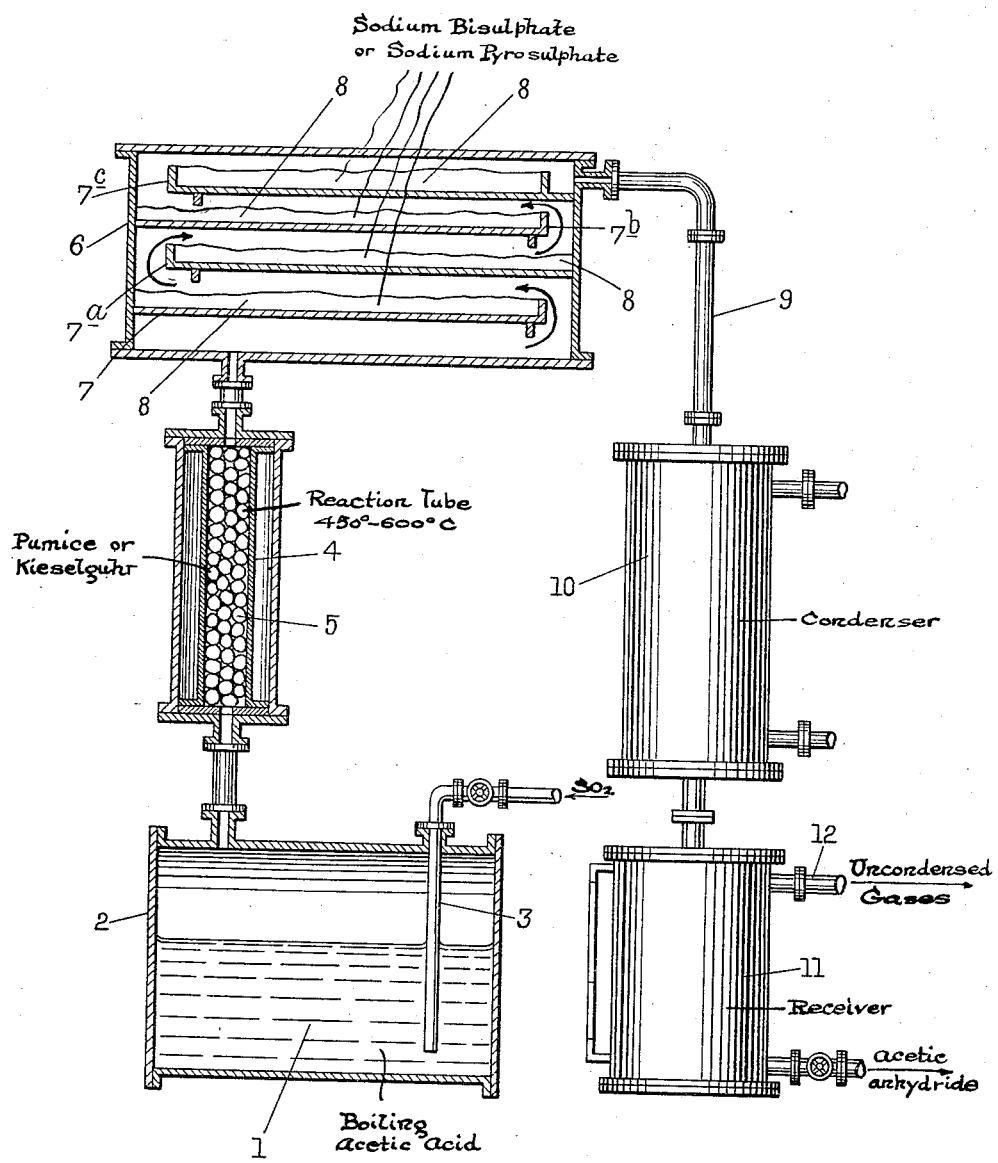

1,911,942

UNITED STATES PATENT OFFICE

HENRY DREYFUS, OF LONDON, ENGLAND

PROCESS FOR THE MANUFACTURE OF ALIPHATIC ANHYDRIDES

Application filed December 27, 1928, Serial No. 328,828, and in Great Britain January 10, 1928.

This invention relates to the manufacture of aliphatic anhydrides from aliphatic acids and especially to the manufacture of acetic anhydride from acetic acid.

According to the invention I have now found that aliphatic anhydrides (and especially acetic anhydride) may readily be produced by subjecting to thermal decomposition i. e. to the action of high or relatively high temperatures, aliphatic acid vapour (and especially acetic acid vapour) in admixture with sulphur dioxide.

In performing the invention I preferably employ mixtures of the acetic (or other aliphatic) acid vapour and sulphur dioxide containing upwards of about 5% of sulphur dioxide, for instance 5% to 20% or more. I may, however, employ mixtures containing smaller quantities of sulphur dioxide, for instance, 2% to 5% of sulphur dioxide.

The reaction may be performed at temperatures of from about 200° C. to 900° C. and preferably at temperatures of from about 300° C. to 600° C. The reaction may, if desired, be performed in presence of filling or contact materials such for example as carborundum, pumice, kieselguhr or like bodies which present a highly developed surface to the reaction gases without being affected thereby or deleteriously affecting the reaction gases.

In performing the invention I may for instance pass the mixture of sulphur dioxide and the aliphatic acid vapour through fireclay, fused silica or other tubes or other form of apparatus heated to the desired temperature, which apparatus may, if desired, be filled or provided with contact or filling materials. For example, I may pass through said heated tubes or apparatus a mixture containing about 80 to 95 parts of acetic acid and 5 to 20 parts of sulphur dioxide.

The mixture of the aliphatic acid vapour and the sulphur dioxide may of course be made in any suitable way. For instance, they may be made by simple admixture of the vapours of the aliphatic acid and of the sulphur dioxide. Or, for instance, a stream of sulphur dioxide or a stream of sulphur dioxide and air may be passed in a stream through boiling acetic (or other aliphatic) acid, the stream of sulphur dioxide (or sulphur dioxide and air) being regulated to ensure the desired composition of the resulting vapour mixture.

Instead of passing a mixture of the aliphatic acid vapour and the sulphur dioxide through the heated tubes or other form of apparatus I may, for instance, introduce or inject into the heated tubes or apparatus the liquid aliphatic acid containing the sulphur dioxide in the desired quantities.

The anhydride produced by the process may be separated or recovered from the reaction gases or vapours in any suitable way. In order to avoid hydrolysis and consequent loss of anhydride the gases or vapours are preferably not submitted to simple condensation but are treated to separate the anhydride from the water vapour present or formed in the reaction. For instance, the gases or vapours from the reaction zone may be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction gases or vapours may be passed through one or more solvents for the anhydride which are insoluble or substantially insoluble in water and of higher boiling point than water (preferably of higher boiling point than the anhydride), such solvents being employed at a temperature or temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction gases or vapours may be subjected to condensation by the process described in British Specification No. 18,098/27 and in the corresponding United States application S. No. 284,566 filed 11 June 1928, that is to say the anhydride may be condensed from the reaction vapours whilst carrying away the water vapour by the vapour of one or more entraining liquids. In such form of execution the reaction vapours are preferably mixed, after leaving the reaction zone, with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are, as indicated in said British Specification No. 18,098/27 and corresponding United States application S. No. 284,566 filed 11 June 1928, benzene, carbon tetrachloride, petrol, mixtures of two or more of such bodies, or mixtures of ether with petroleum ether; it will be understood, however, as explained in the said British Specification No. 18,098/27 and corresponding United States application S. No. 284,566 filed 11 June 1928, that any other liquids chemically inert to the anhydride and having a high entraining capacity for water may be employed. The liquids should preferably have a low entraining capacity for the anhydride.

Or, for instance, the reaction gases or vapours may be subjected to condensation by the process described in British Specification No. 18661/27 and in the corresponding United States application S. No. 285,613 filed 15 June 1928, that is to say they may be subjected to condensation by leading them under the surface of an "extracting" liquid cooled down or otherwise kept at temperatures below (and preferably considerably below) the boiling point of water. As explained in the said British Specification No. 18,661/27 and in the corresponding United States application S. No. 285,613 filed 15 June 1928, by the term "extracting" liquid is meant a liquid or liquid mixture which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. As stated in the said British Specification No. 18,661/27 and corresponding United States application S. No. 285,613 filed 15 June 1928, it is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction gases or vapours may be treated by the process described in British Specification No. 289,972 and corresponding United States application S. No. 242,977 filed 27 December 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and the resulting risk of loss of anhydride through hydrolysis, and for the best functioning of the treatment the water binding substances should be employed at temperatures above the boiling point of the anhydride in which case the water can be substantially absorbed and the anhydride pass on in vapour form. As explained in my said British Specification No. 289,972 and corresponding United States application S. No. 242,977 filed 27 December 1927, the term "water binding" substance means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

The anhydride separated or recovered from the reaction gases or vapours may if desired or required be purified by any suitable means. For instance, it may be distilled from anhydrous sodium or other acetate. Or, for instance, it may be first treated with chlorine in presence of anhydrous sodium acetate, and subsequently distilled, such treatment serving to remove, largely or entirely any sulphur dioxide or other sulphur compounds present.

It will be understood that the invention is not limited as to the strength of the aliphatic acid to be employed as the process may be performed with the vapours of dilute or highly concentrated aliphatic acids.

The accompanying diagrammatic drawing serves to illustrate, by way of example, one convenient form of execution of the invention.

Referring to the drawing, glacial acetic acid 1 is boiled in the still 2 and sulphur dioxide is passed in a rapid stream through the boiling acetic acid, the sulphur dioxide being introduced through the pipe 3 at such a rate that the vapours leaving the still 2 contain 5% to 10% of sulphur dioxide. The vapours leaving the still 2 pass via the pipe 3a into the hot reaction vessel 4 through which they are passed at a rapid rate. The reaction vessel 4 is made of fireclay or fused silica and is filled with balls or stones of pumice or kieselguhr 5 and is heated by any convenient means to a temperature between 450° and 600° C. The hot reaction gases on leaving the vessel 4 pass to the vessel 6 wherein they pass successively over the trays 7, 7a, 7b and 7c which are covered with sodium bisulphate or sodium pyrosulphate 8, the temperature of the vessel 6 being kept between 150° and 350° C. and preferably between 150° and 200° C. The water vapour present in the reaction gases is substantially absorbed by the sodium bisulphate or sodium pyrosulphate, the anhydride present in the reaction gases remaining in vapour form. The reaction gases leave the vessel 6 by the pipe 9 passing thence to the condenser 10 and the condensed acetic anhydride is collected in the receiver 11. Any uncondensable gases are allowed to escape by the pipe 12.

The anhydride collected in the receiver 10 may be purified by any suitable method. For instance, any sulphur or sulphur compounds present therein may be removed by the process described in U. S. Letters Patent No. 1,696,363 of Dec. 25, 1928, i. e. the anhydride may be treated with sodium acetate or other metallic acetate and chlorine and subsequently distilled.

What I claim and desire to secure by Letters Patent is:—

1. Process for the manufacture of aliphatic anhydrides which comprises subjecting a mixture of sulphur dioxide and the vapor of an aliphatic acid to thermal decomposition.

2. Process according to claim 1 and wherein mixtures of aliphatic acid vapors and sulphur dioxide containing between 5% and 20% of sulphur dioxide are employed.

3. Process according to claim 1 wherein the reaction is performed at temperatures between 200° C. and 900° C.

4. Process according to claim 1 and wherein the hot reaction vapors are treated to separate the anhydride from the water vapor contained in said vapors.

5. Process according to claim 1 and wherein the mixture of aliphatic acid vapor and sulphur dioxide is subjected to thermal decomposition by passing said mixture through heated apparatus containing filling materials.

6. Process for the manufacture of acetic anhydride which comprises subjecting a mixture of sulphur dioxide and acetic acid vapor to thermal decomposition.

7. Process for the manufacture of aliphatic anhydrides which comprises subjecting a mixture of sulphur dioxide and a vapor of an aliphatic acid to thermal decomposition at temperatures between 300 and 600° C. and treating the hot reaction vapors to separate the anhydride from the water vapor contained in said vapors.

8. Process for the manufacture of acetic anhydride which comprises subjecting to thermal decomposition a mixture of 80–95 parts of acetic acid vapor and 5–20 parts of sulphur dioxide.

9. Process for the manufacture of acetic anhydride comprising passing a mixture of acetic acid vapor and sulphur dioxide in a stream through a tube heated to a temperature between 300° and 600° C. and filled with balls of pumice, and causing the reaction vapors to leave said tube and to pass in contact with at least one water binding agent maintained at a temperature between 150° and 200° C.

10. Process for the manufacture of acetic anhydride comprising passing a mixture of acetic acid vapor and sulphur dioxide, said mixture containing between 5 and 10% of sulphur dioxide, in a stream through a tube heated to a temperature between 300° and 600° C. and filled with balls of pumice, and causing the reaction vapors to leave said tube and to pass in contact with sodium pyrosulphate heated to a temperature between 150° and 200° C.

In testimony whereof I have hereunto subscribed my name.

HENRY DREYFUS.